United States Patent Office 3,445,779
Patented May 20, 1969

3,445,779
CONTROLLERS OF THE DURATION-ADJUSTING TYPE WITH ELECTRICAL SNAP-ACTION
Thomas J. Walsh, Hatboro, Pa., assignor to Leeds & Northrup Company, Philadelphia, Pa., a corporation of Pennsylvania
Filed Mar. 29, 1966, Ser. No. 538,415
Int. Cl. H03g 1/00; H03f 3/04
U.S. Cl. 330—51          11 Claims

ABSTRACT OF THE DISCLOSURE

A controller of the duration-adjusting type algebraically adds a DC signal current and a pulsating feedback signal current at the input of an amplifier. A relay is connected to the output of the amplifier to control the load. The relay also controls the pulsation of the feedback signal by periodically controlling the charging and the discharging of a reactive impedance and periodically adding and subtracting the voltage across a snap-action resistor to and from the feedback signal.

---

This invention relates to electrical controllers for regulating an input of a process or system.

The present invention is particularly concerned with improvement of controllers of the duration-adjusting type, such as disclosed for example in Davis Patent 2,797,291, and is characterized by one or more of the following features: an electrical snap-action which insures positive action of switching means of the controller; the provision of a proportional-band voltage which varies substantially as the square of the voltage of a power-line used for supplying power to the controlled process or system and subject to normal variations; an "approach" network effective, during start-up of the process for example, to limit or disable the reset action of the controller when its signal exceeds the proportional-band setting; and controller feedback circuitry compatible with circuitry of solid-state amplifiers.

Specifically in preferred forms of the controller, a DC error signal of the controlled process or system is combined with a pulsating DC feedback signal as the input of an amplifier. Switching means responsive to the amplifier output controls the action of a feedback network producing said pulsating DC signal by repeatedly charging and discharging the reactance of a proportional-band network and concurrently with initiation of each charging interval and of each discharging interval, abruptly changing the level from and to which the voltage on said reactance means rises or falls.

The controller circuitry may also include a network which derives from the power-line supplying electrical power to the process-load a proportional-band voltage which varies substantially as the square of the power-line voltage over the usual range of variation, thus automatically to vary the ratio of the ON/OFF intervals of the recorder as a linear function of the average value of electrical power delivered to the process-load.

The controller circuitry may also include an approach circuit which in effect compares the amplifier input voltage with the preset proportional-band voltage and which is effective to limit the voltage accumulating on the reactance of a reset-action reactance during start-up of the process or other large load demand.

The invention further resides in controller systems and circuitry having new and useful features of combination and arrangement hereinafter described and claimed.

Figure 1:
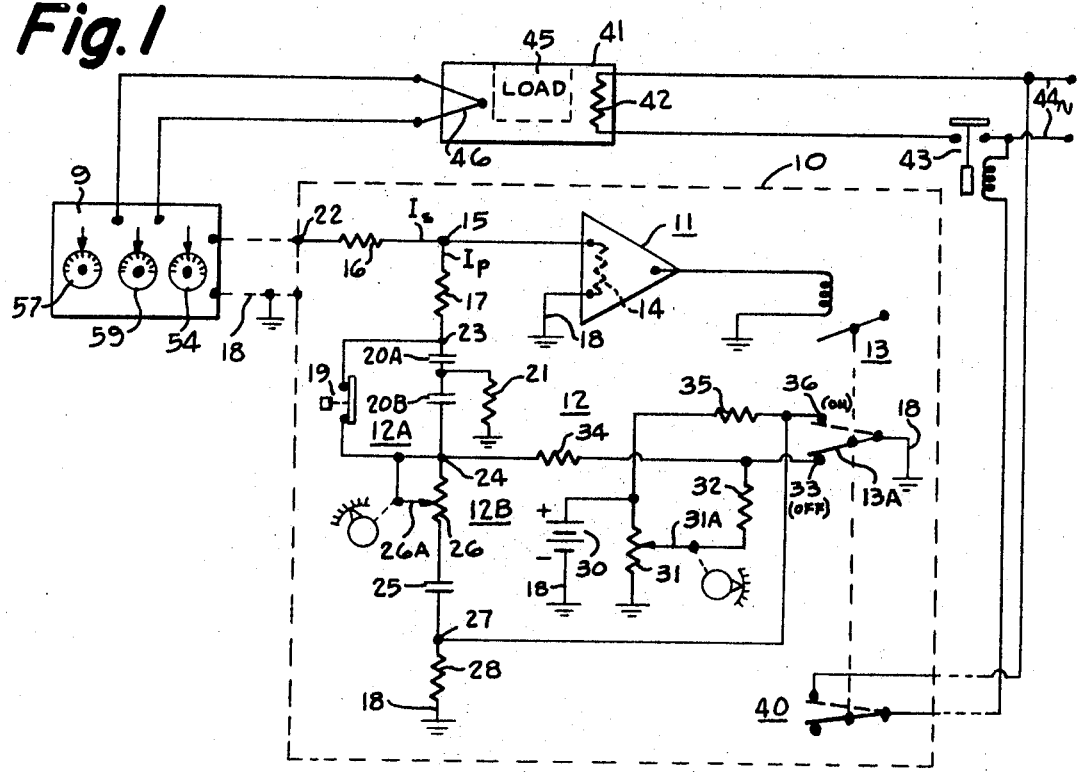
Figure 2A:
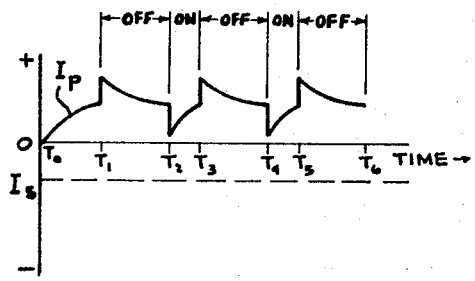
Figure 2B:
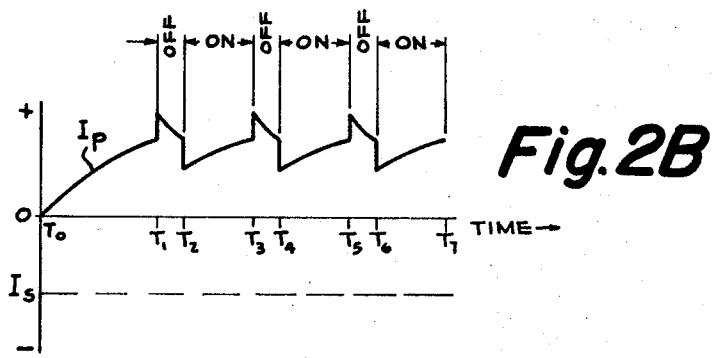
Figure 3A:
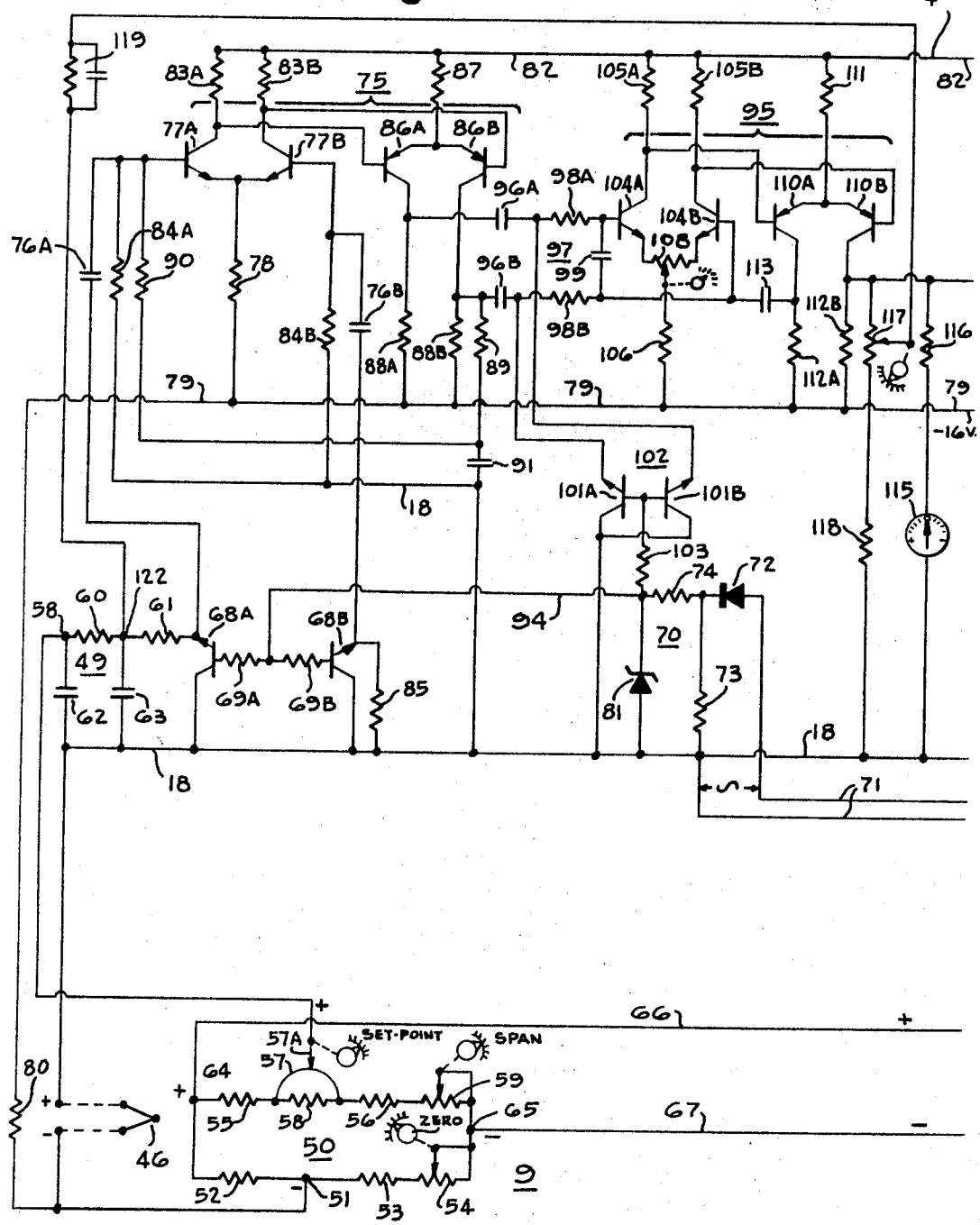
Figure 3B:
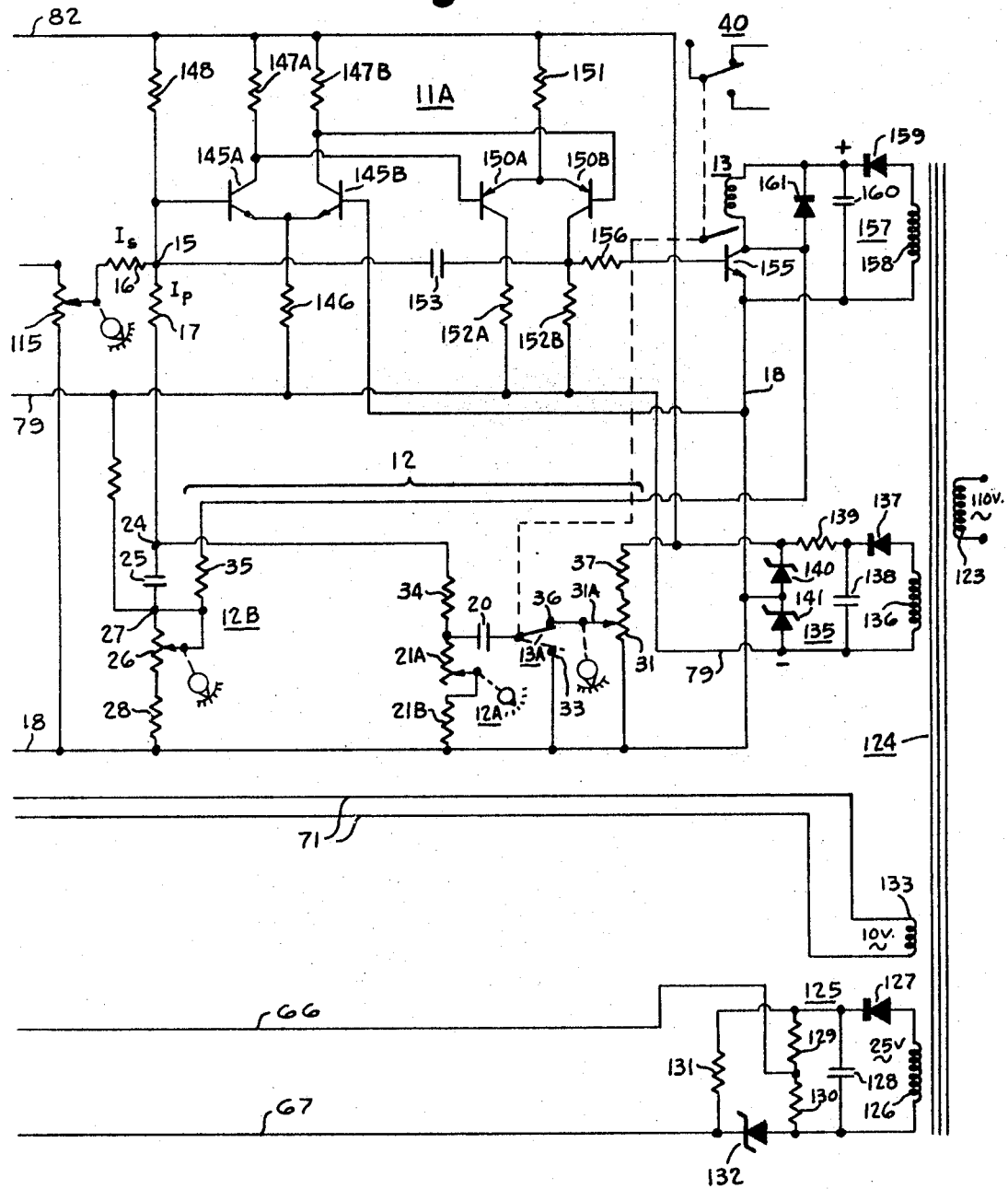
Figure 3C:
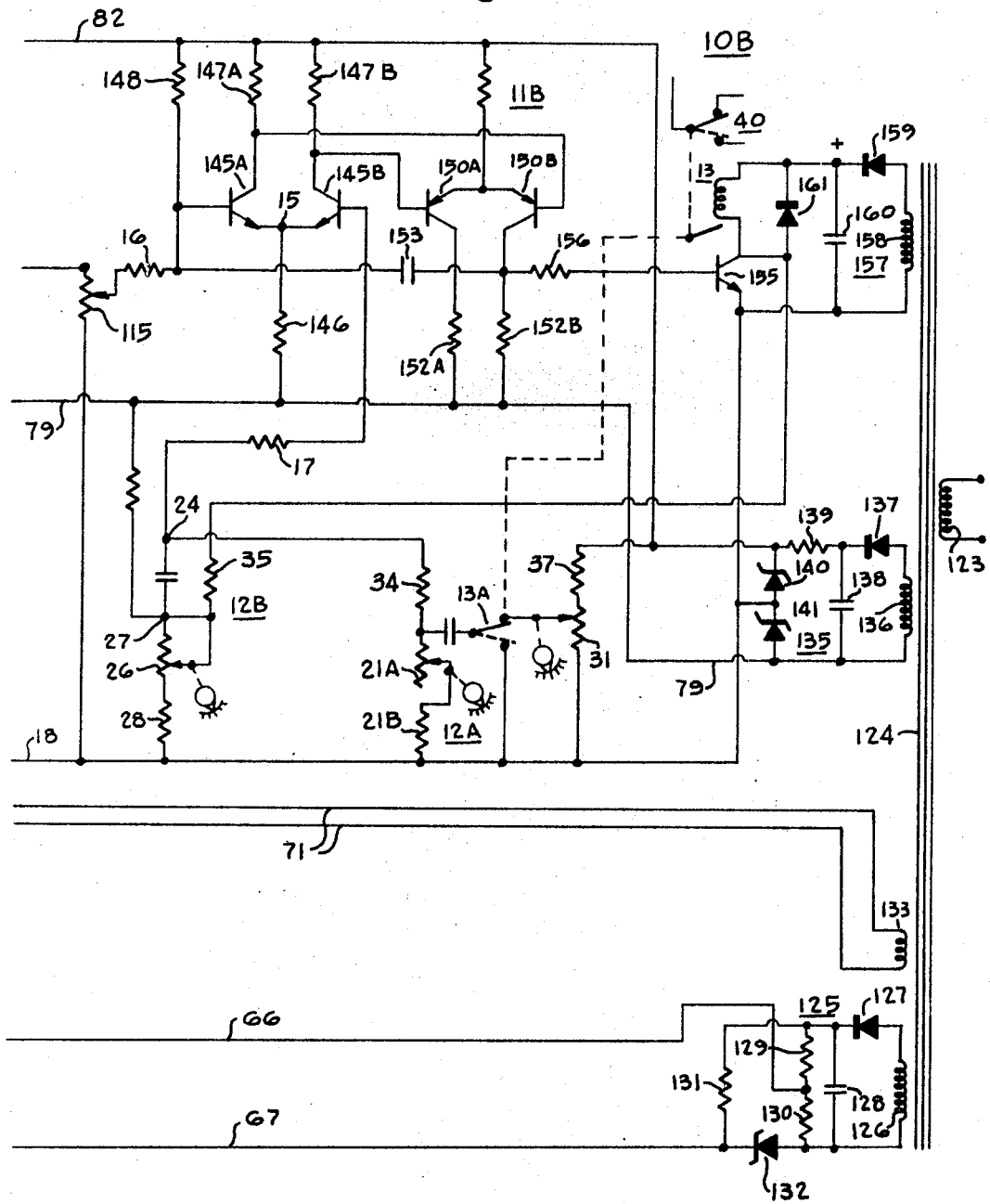
Figure 4:
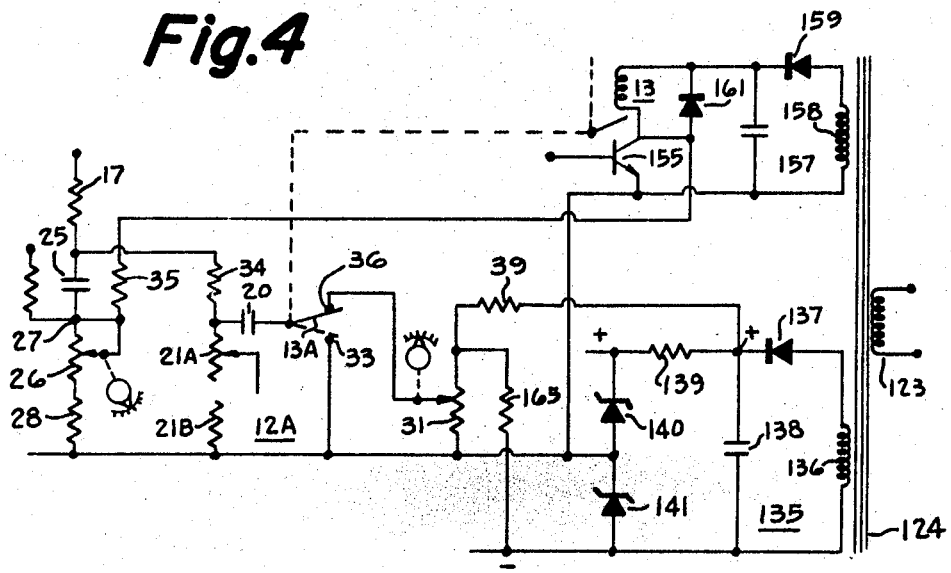
Figure 5:
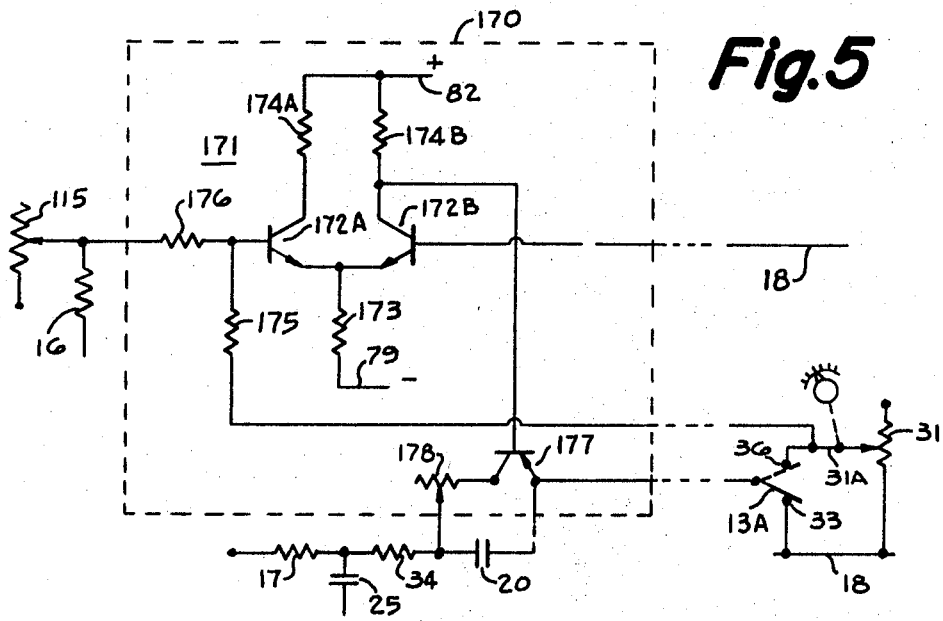

For a more detailed understanding of the invention, reference is made to the following description of controller systems embodying it and to the accompanying drawings in which:

FIG. 1 diagrammatically illustrates one form of the controller as used for a typical furnace application;

FIGS. 2A–2B are explanatory figures referred to in discussion of the operation of the controller of FIG. 1 and later figures;

FIGS. 3A and 3B jointly provide a circuit schematic of a preferred form of controller together with associated circuitry including that of solid-state amplifiers, power supplies, and signal networks;

FIGS. 3A and 3C jointly form a modification of the control circuitry of FIGS. 3A, 3B;

FIG. 4 illustrates a modification of part of the controller circuitry of FIG. 3B to provide automatic compensation for line-voltage variations; and FIG. 5 illustrates an approach network and its connections to components of the controller circuits shown in FIGS. 3B, 3C and 4 for automatic modification of their reset action.

Referring to FIG. 1, the controller 10 comprises an amplifier 11 whose input circuit is excited jointly by a DC signal current $I_s$ which is a function of the magnitude of a variable to be controlled and current pulses $I_p$ of variable duration derived from network 12 under control of switching means, exemplified by relay 13, responsive to the output of amplifier 11. Specifically in FIG. 1, input impedance 14 of amplifier 11 is connected between the current-summing junction 15 or common terminal of input resistors 16, 17 and a circuit-common or reference point 18. The source 9 of signal current is connected between the other terminal 22 of resistor 16 and reference point 18. The feedback network 12 comprising reset-action network 12A and proportional-action network 12B is connected between the other terminal 23 of resistor 17 and reference point 18. With switch 19 closed, the reset-action network 12A comprising capacitors 20A, 20B and resistor 21 is effectively excluded from network 12: in such case, the terminal 23 of resistor 17 is connected to one terminal 24 of the proportional-action network 12B comprising capacitor 25 and resistor 26. The other terminal 27 of network 12B is connected to the circuit-common 18 via the snap-action resistor 28.

The DC source 30 for supplying charging current to capacitor 25 has its lower terminal connected to the circuit-common 18 and is shunted by potentiometer 31 whose contact 31A is adjustable to preset the voltage available for charging. The movable contact 31A of this proportional-band setter is connected via resistor 32 to the lower fixed contact 33 of relay 13 and is also connected via resistors 32, 34 to upper terminal 24 of network 12B. The upper terminal of DC source 30 is connected via resistor 35 to the upper fixed contact 36 of relay 13 and to the lower terminal 27 of network 12B.

When the contact 13A of relay 13 is moved to engage fixed contact 36, the resistor 28 which serves as a supplemental signal source is short-circuited so that point 27 of network 12B immediately assumes the same potential as the circuit-common 18. At the same time, charging current for capacitor 25 flows from DC source 30 through the path including resistors 32, 34 and 26. In consequence, the voltage between point 24 of network 12B and the reference point 18 increases toward a value corresponding to the proportional-band setting of contact 31A and at a rate dependent upon the time-constant of the capacitor charging circuit which includes, inter alia, the resistors 26, 34, 32. In this connection, it is to be noted that the effective value of resistor 26 in this circuit may be preset by adjustment of its contact 26A. For the indicated poling of source 30, the potential at point 24 increases in positive direction with respect to the circuit-common 18 during such charging of capacitor 25. Accordingly, the positive current $I_p$ flowing from network 12 to the summing point 15 via resistor 17 increases in magnitude at a rate dependent on the CR product of the charging circuit and the effective supply voltage as established by the setting of contact 31A of the proportional-band setter.

When contact 13A of relay 13 moves away from fixed contact 36 and into engagement with fixed contact 33, the potential of point 27 of network 12B immediately rises in positive direction from that of the circuit-common 18 with consequent immediate rise to corresponding extent of the positive potential at point 24 with respect to the circuit-common 18. At the same time, the capacitor 25 starts discharging through a path to the circuit-common 18 including resistors 26, 34 and contacts 33, 13A of relay 13. In consequence, the positive potential at point 24 of network 12B starts falling. The rate at which point 24 falls in potential is dependent upon the time-constant of the discharge circuit and, therefore, inter alia, upon the effective values of resistors 26, 34.

When the algebraic sum of the input currents $I_s$, $I_p$ at the summing junction 15 is essentially zero, the relay 13 in the output circuit of amplifier 11 is in deenergized state with its movable contact 13A in the full-line position shown for drain-off of any charge of capacitor 25. Assuming the controller 10 is put into operation at time $T_o$ (FIG. 2A) for a small negative value of signal current $I_s$ and a zero value of feedback current $I_p$, the relay 13 shifts to its energized state and contact 13A moves away from contact 33 and into engagement with contact 36 to initiate charging of capacitor 25 as above described. The progressive rise in voltage of point 24 of network 12 with respect to circuit-common 18 (switch 19 still assumed closed) causes flow through resistor 17 of an increasing positive current $I_p$ until at time $T_1$ its magnitude becomes equal and opposite to that of signal current $I_p$, whereupon contact 13A of the now deenergized relay 13 moves away from contact 36 to effect a further and abrupt rise in voltage at point 24 with consequent further and abrupt rise in current $I_p$ to insure hold-out of the relay 13.

With contact 13A of the deenergized relay now engaging its fixed contact 33, the capacitor 25 starts discharging, as above described, until at time $T_2$ the voltage at point 24 of network 12 and, therefore, the current $I_p$ through resistor 17 falls to equality with the negative signal current $I_s$. Thereupon, the relay 13 is reenergized. The resulting engagement of contact 13A with fixed contact 36 immediately effects a further and abrupt decrease in voltage at point 24 with further and abrupt drop in current $I_p$ to insure hold-in of the relay 13.

With contact 13A of the now energized relay engaging its fixed contact 36, the capacitor 25 starts recharging again until at time $T_3$ the signal and feedback currents $I_s$, $I_p$ are again equal, so completing between times $T_1$–$T_3$ a pulse cycle of the controller. For the small value of current $I_s$ above assumed, the ON time of relay 13 is short compared to the OFF time and this ratio of ON to OFF times remains the same in subsequent cycles so long as the value of signal current remains the same. If, however, the signal current $I_s$ is substantially greater than above assumed, the ON time of relay 13 (FIG. 2B) is greater than its OFF time, the ratio of OFF to ON times again, however, remaining constant for the particular value of signal current. Of course, at some value of signal current $I_s$ intermediate those shown in FIGS. 2A, 2B, the ON and OFF times of the controller relay 13, or equivalent, are equal and remain so for that value of current $I_p$. In other words, this action of the controller, due to pulsing of network 12B under control of output relay 13, is a proportional action plus a snap action which precludes erratic marginal operation of relay 13 despite component or operational variables, such as friction, temperature, and amplifier noise. The pulsing rate, or cycle time, for a given value of input current $I_s$ may be preset by adjustment of the value of resistor 26 to tune the controller 10 for a particular system or process.

The relay 13 of controller 10 also includes another set of contacts or switch 40 for controlling an input of a process or system. Specifically in FIG. 1, the controller 10 is used to regulate the heat input to furnace 41 of electrically-heated type. Since the current requirements of the heating resistor 42 exceed the current-carrying capacity of the contacts of the sensitive relay 13, a heavy-duty relay or contactor 43 is used to connect resistor 42 to the power-line 44 and the relay switch 40 controls the coil circuit of the contactor. Thus, when the relay switch 40 of the controller 10 is closed (dotted-line position), the heater 42 is energized to raise the temperature of the furnace 41 and its load 45, and, conversely, when relay switch 40 is open (full-line position), the heater 42 is deenergized and the furnace temperature falls.

The input signal $I_s$ of controller 10 is derived from the output of thermocouple 46 or other temperature-sensitive device by unit 9, a suitable form of which is subsequently described.

With controller 10 as thus described and as adjusted for stable operation, the furnace temperature as regulated by the proportional action of the controller 10 would be subject to droop, i.e., the greater the furnace load, the lower the regulated temperature. To introduce into the operation of controller 10 a reset action automatically corrective of such droop, the switch 19 is opened and in effect to connect the network 20A, 20B, 21 in circuit. Specifically, in the reset circuitry of FIG. 1, the capacitors 20A, 20B of reset-action network 12A are connected in series between point 24 of the proportional network 12B and terminal 23 of feedback input resistor 17 and the resistor 21 of reset-action network 12A is connected between the common terminal of capacitors 20A, 20B and the circuit-common 18.

Network 12A has a much longer time constant than that of the proportional network 12B and, with switch 19 open or omitted, integrates the current pulses through feedback resistor 17. The effect of such integrations for continued difference between the signal current $I_s$ and the average value of the pulsed feedback current $I_p$ is slowly to increase the potential-difference between points 23, 24 of the controller network 12 in sense tending slowly to increase the ratio of ON time to OFF time of relay 13 and, therefore, of power contactor 43 or equivalent final control element for furnace 41.

In FIG. 1, the source 9 of signal current $I_s$ for controller 10 is shown en bloc: preferred circuitry for source 9 is shown in FIG. 3A now described. The thermocouple 46, or other device responsive to the controlled condition, is connected between the circuit-common 18 and output point 51 in the lower pair of arms of bridge network 50. The resistors 52, 53 of the lower pair of bridge arms are in series with resistor 54 which is adjustable to set the "zero" of the bridge. The upper pair of bridge arms includes fixed resistors 55, 56, calibrated slidewire 57 connected in series between resistors 55, 56, a fixed resistor 58 in shunt to slidewire 57 and an adjustable "Span" resistor 59. The relatively adjustable "Set-Point" contact 57A of slidewire 57 forms the second output terminal of bridge 50 and is connected to input terminal 58 of a filter 49 comprising resistors 60, 61 and capacitors 62, 63. Direct current is supplied to the input terminals 64, 65 of the bridge 50 via conductors 66, 67 from a suitable power source, such for example as later described in discussion of FIG. 3B or FIG. 3C. For fail-safe operation of the controller in event of thermocouple failure, point 51 of the bridge 50 is connected to one or the other of conductors 79 or 82.

The output voltages respectively produced by the thermocouple 46 and bridge 50 are in series across the input terminals 58, 18 of filter 49 and jointly constitute an error or unbalance signal. Thus, for the thermocouple and bridge-output polarities indicated, the input terminal 58 of filter 49 is positive with respect to circuit-common 18 for temperature values below the "Set-Point," zero at the Set-Point and negative for values above the Set-Point. The resulting smoothed DC output of filter 49 is converted to DC pulses of corresponding magnitude by a solid-state chopper. Specifically, the collector and emitter of transistor 68A respectively are connected to the circuit-common 18 and the output terminal of resistor 61. The base of transistor 68A is connected by isolating resistor 69A and conductor 94 to a network 70 which derives positive DC gating pulses from an AC line-frequency voltage across supply conductors 71, 71. Specifically, network 70 comprises the rectifier diode 72, resistors 73, 74 and Zener diode 81.

The AC component of the chopped unbalance signal is applied to the A-channel of the first stage of AC differential amplifier 75. Specifically, and to that end the emitter of chopper-transistor 68A is coupled by capacitor 76A to the base of the A-channel first-stage transistor 77A. The emitter-circuit resistor 78 common to transistors 77A, 77B of the first differential stage is connected to the negative supply conductor 79. The collectors of the first-stage transistors 77A, 77B are respectively connected to the positive supply conductor 82 by load resistors 83A, 83B. The DC operating-point bias for the bases of first-stage transistors 77A, 77B is provided by resistors 84A, 84B connected between the respective bases and the circuit-common 18.

The base of the B-channel first-stage transistor 77B is coupled by capacitor 76B to the emitter of a second chopper 68B. The collector of chopper-transistor 68B is connected to the circuit-common 18 and is connected to the emitter of that transistor by resistor 85. A pulsating current of line-frequency is supplied to the base circuit of transistor 68B from the rectifier network 70 via the isolating resistor 69B.

In consequence, the AC signal output of the first differential stage of amplifier 75 is accurately representative of the DC unbalance between the output voltages of the thermocouple 46 and bridge network 50. For application of such AC signal to the second stage of amplifier 75, the collectors of first-stage transistors 77A, 77B are respectively connected to the bases of the second-stage transistors 86A, 86B. The common emitter-circuit resistor 87 for transistors 86A, 86B is connected to the positive supply conductor 82 and their respective collector-circuit output resistors 88A, 88B are connected to the negative supply conductor 79.

For operating-point stabilization, the collector of second-stage channel-B transistor 86B is connected by DC feedback circuit resistors 89, 90 to the base of the first-stage channel-A transistor 77A. The common terminal of these feedback resistors is coupled to the circuit-common 18 by filter-capacitor 91.

The AC output of differential amplifier 75 is demodulated and applied to a differential DC amplifier 95. Specifically, the collectors of the output transistors 86A, 86B of amplifier 75 are respectively coupled by capacitors 96A, 96B to the input terminals of a smoothing filter network 97 comprising series resistors 98A, 98B and shunt capacitor 99. The input terminals of network 97 are respectively connected to the emitters of a transistor pair 101A, 101B forming a solid-state demodulator. The collectors of transistors 101A, 101B are connected via the circuit-common 18 to the negative terminal of rectifier network 70 and the base of these transistors are connected via resistor 103 to the positive terminal of that network.

The resulting high-level DC unbalance signal as appearing at the output terminals of filter network 97 is applied between the bases of the first-stage transistors 104A, 104B. The collectors of these transistors are respectively connected to the positive supply conductor 82 by load resistors 105A, 105B and their emitters are connected to the negative supply conductor 79 by the common emitter-circuit resistor 106. For balancing of the emitter currents, a potentiometer 108 is provided with its adjustable contact connected to the upper terminal of resistor 106 and its end terminals connected to the emitters of transistors 104A–104B.

The bases of the second-stage transistors 110A, 110B are respectively directly coupled to the collectors of first-stage transistors 104A, 104B. The emitters of the transistors 110A, 110B are connected to the positive supply conductor 82 by common resistor 111 and the collectors of these transistors are respectively connected by output resistors 112A, 112B to the negative supply conductor 79. The capacitor 113 between the collector of second-stage transistor 110A and the base of first-stage transistor 104B is provided to aid amplifier stability and reduce noise.

The meter 115 connected in series with resistor 116 between the collector of output transistor 110B of amplifier 95 and circuit-common 18 is for reading the DC output of DC amplifier 95 which results from application of the original unbalance signal to the AC amplifier 75. For adjustment of gain of the amplifier, there is provided a divider circuit comprising resistors 117, 118 connected between the same points as meter 115 and resistor 116. The adjustable contact of resistor 117 is connected via RC network 119 to point 122 in the input filter network 49 of the unbalance-signal-chopper 68A.

The circuitry shown in FIG. 3A, with suitable power supplies, is suited to provide the signal current $I_s$ for the controller 10 of FIG. 1. It is also suited for connection to the modified controller 10A of FIG. 3B and its power supplies.

Joining FIGS. 3A and 3B, it will be noted that the DC power-supply conductors 66, 67 for measuring bridge network 50 of FIG. 3A extend to a rectifier network 125 (FIG. 3B) comprising the secondary winding 126 of transformer 124, rectifier 127, filter capacitor 128, resistors 129, 130, 131 and Zener diode 132; that the AC power-supply conductors 71, 71 for the rectifier network 70 of FIG. 3A extend to the secondary winding 133 of power transformer 124 (FIG. 3B); and that the DC power-supply conductors 82, 79 for amplifiers 75, 95 of FIG. 3A extend to a rectifier network 135 comprising the secondary winding 136 of power transformer 124, rectifier 137, filter capacitor 138, resistor 139 and Zener diodes 140, 141; and that the circuit-common 18 of FIG. 3A extends to the common terminal of Zener diodes 140, 141.

In FIG. 3B, the amplifier 11A of controller 10A is a DC differential amplifier of solid-state type. The emitters of the first-stage transistors 145A, 145B are connected to the negative supply conductor 79 via the common emitter-circuit resistor 146 and the collectors of those transistors are respectively connected to the positive supply conductor 82 via resistors 147A, 147B. The base of transistor 145B is connected to the circuit-common 18 and the base of transistor 145A is connected to the summing junction 15 of the input currents $I_s$, $I_p$ and also to the positive supply-conductor 82 via resistor 148. For applying the DC output signal of the first stage of amplifier 11A to the second stage, the collectors of transistors 145A, 145B are directly coupled respectively to the bases of the second-stage transistors 150A, 150B. The emitters of transistors 150A, 150B are connected to the positive supply-conductor 82 by the common emitter-circuit resistor 151 and the collectors of these transistors are respectively connected to the negative supply conductor 79 by resistors 152A, 152B. For stabilization of amplifier 11A, the collector of output transistor 150B is coupled by capacitor 153 to the base of input transistor 145A.

In FIG. 3B, the output of amplifier 11A is used to switch the relay-driver transistor 155. Specifically, the collector of output transistor 150B of the amplifier 11A is connected via resistor 156 to the base of transistor 155 and the emitter of driver transistor 155 is connected to circuit-common 18. The coil of relay 13 is connected between the collector of transistor 155 and the positive terminal of rectifier network 157 comprising the secondary winding 158 of transformer 124, rectifier 159 and filter capacitor 160. The reversely-poled diode 161 is connected across the coil of relay 13 to provide, when the driver transistor 155 is switched to its OFF state, for rapid dissipation of the energy stored in the field of the coil.

The feedback network 12 of FIG. 3B is generally similar to network 12 of FIG. 1 with corresponding elements identified by like reference characters. For brevity, discussion of network 12A is principally directed to specific differences from network 12 of FIG. 1.

In FIG. 3B, the resistors 35, 26, 28 are connected in series between the circuit-common 18 and the collector of the relay-driver transistor 155. Thus, when transistor 155 is in the OFF state, the potential of point 27 of the proportional network 12B is determined by current flowing from DC supply 157 through the relay coil and resistors 35, 26, 28. This current is of small magnitude, insufficient to move the relay contacts so that the relay may properly be considered in OFF state. For such state, the relay contact 13A is in its dotted-line position in engagement with fixed contact 33 which is connected to the circuit-common 18. When contact 13A is moved to such position upon effective deenergization of relay 13, the proportional action capacitor 25 starts discharging through resistor 34 into the reset network 12A and capacitor 20 of the reset network starts discharging at much lower rate in the loop circuit including closed contacts 13A, 33 and resistors 21A, 21B.

When the potential at point 24 of network 12 falls to or below the value for which the feedback current $I_p$ is less than the signal current $I_s$, the driver transistor 155 is switched ON to energize the relay 13. With transistor 155 in conductive state, no voltage is applied across resistors 35, 26, 28 from DC supply 157 and point 27 of network 12B assumes the potential of the circuit-common 18. With relay contact 13A now moved into engagement with fixed contact 36, charging current for capacitors 20, 25 starts flowing from DC source 135. The effective charging voltage, as in FIG. 1, depends upon the position of adjustable contact 31A of the proportional-band resistor 31.

Thus, as in the controller 10 of FIG. 1, the feedback network under control of output relay 13 produces current pulses whose duration per pulse cycle depends primarily on the difference between the signal current and the average of the feedback pulses, but also is dependent upon a time-integration of such difference.

Suitable values for components of the feedback network of a typical controller 10A, such as is shown in FIG. 3B, are given in the following table.

TABLE

| Resistors | Capacitors ($\mu f$) | Power supplies (volts DC) |
|---|---|---|
| 16, 1M ohm | 25–250 | 135+16.0, −16 |
| 17, 470K ohm | 20–1,000 | 157–30 |
| 21A, 1M ohm | | |
| 21B, 4.7K ohm | | |
| 26, 5K ohm | | |
| 28, 100 ohm | | |
| 31, 1K ohm | | |
| 34, 470K ohm | | |
| 37, 2.2 K ohm | | |

The circuitry shown in FIG. 3A is also suited for connection to the modified controller 10B of FIG. 3C and its power supplies. The controller 10B, except for differences below discussed, is the same as controller 10A and its corresponding elements are identified by the same reference characters. In FIG. 3C, the base of transistor 145B, instead of being connected to the circuit-common 18, is connected via pulse input resistor 17 to point 24 of the feedback network, and collector-to-base connections from 145A to 150A, and 145B to 150B respectively are interchanged. Thus, in effect the common-emitter connection of the first-stage transistors 145A, 145B serves as the current-summing junction 15. The combined circuitry of FIGS. 3A, 3C, as shown, provides proper controller action where, for example, the controlled agent is for cooling the load but can be made to operate in reverse sense for heating applications; conversely, the combined circuitry of FIGS. 3A, 3B can be made to operate in reverse sense for cooling applications.

The circuitry of the controllers 10A, 10B may be slightly modified to provide automatic compensation for the effect of line-voltage variations upon the heat-output of heating resistors, such as 42 of FIG. 1, supplied from the same power-line as the controller. As shown in FIG. 4, the upper terminal of the proportional-band resistor 31, instead of being connected via resistor 37 (FIG. 3B) to the lower positive voltage side of filter resistor 139, is connected via resistor 39 to the higher positive voltage side of filter resistor 139 and also, via resistor 165, to the negative side of the rectifier network 135. For this modification, the values of resistors 31, 39, 165 are respectively 2, 4.7, 3.9 kilohms. Thus, the voltage drop across the band-setting resistance 31, for the usual range of line-voltage variation, will vary substantially as the square of the line voltage applied both to the heater 42 of furnace 41 (or other electrically-heated device) and to the primary 123 of the controller power supply transformer 124.

The approach circuit within the dotted rectangle 170 of FIG. 5 may be added to controller 10A (FIG. 3B), for example, to provide for adjustment of the point at which its proportional control action begins during a process start-up. The single-stage DC differential-amplifier 171 comprises transistors 172A, 172B whose emitters are connected by common resistor 173 to the negative supply conductor 79. The collectors of these transistors are respectively connected by resistors 174A, 174B to the positive supply conductor 82. The base of transistor 172A is connected via resistor 175 to the adjustable contact 31A of the proportional-band resistor 31 and also via resistor 176 to the adjustable contact of the input potentiometer 115 of the controller-amplifier. The collector of transistor 172B is connected to the base of transistor 177 whose emitter is connected to one side of the reset capacitor 20 and whose collector is connected via adjustable resistor 178 to the other side of that capacitor.

In effect, the differential amplifier 171 looks both at the voltage input to the controller-amplifier 11A and the voltage set by the proportional-band potentiometer 31. When the volage input to the controller-amplifier 11A is greater in magnitude than the voltage setting of potentiometer 31, the output of the differential amplifier 171 swiches the transistor 177 to its ON state and so shunts the reset capacitor 20 by the resistor 178. Adjustment of resistor 178 determines the amount of current $I_p$ that can flow to the controller summing point 17 and, accordingly, fixes the point at which proportional action of the controller begins. There is thus avoided during start-up of a process the accumulation by reset capacitor 20 of an excessive charge precluding proportional action of the controller until the control point of the process is reached.

It shall be understood the invention is not limited to the systems specifically disclosed and described but also comprehends modifications and equivalents within the scope of the appended claims.

What is claimed is:
1. A controller system comprising
   an amplifier having an input connected to a current-summing point and having an output,
   a pair of resistance means having one end of each connected together at said current-summing point,
   a DC signal current applied to one end of one of said resistance means providing a path for flow of the DC signal current therethrough, and
   switching means having opposing states coupled to the output of said amplifier and whose state is changed as the algebric sum of the currents at said current-summing point passes through zero, and feedback means for effecting flow through the other end of the other of said resistance means of current pulses under the control of said switching means comprising a first network including a first reactive impedance means coupled to said other end of said other of said resistance means, a source of charging current, and a point of reference potential, said switching means coupled to said first reactive impedance means connecting said first reactive impedance means to said source of charging current during intervals for which said switching means is in one state and connecting said first reactive impedance means to said reference point during intervals for which said switching means is in the opposite state, the ratio of said charging and discharging intervals being dependent upon the level of said signal current.

2. A system as in claim 1 in which said feedback means additionally includes a second network coupled between said first reactive impedance and said other end of said other of said resistance means having a second reactive impedance charged and discharged under control of said switching means to modify the ratio of said intervals in dependence upon the magnitude and duration of said signal current.

3. A system as in claim 2 additionally including means connected to said second reactive impedance and effective when said DC signal current attains a predetermined value to reduce the modifying effect of said second network.

4. A controller system comprising a high-gain amplifier whose input comprises a DC error signal and a pulsating DC feedback signal, switching means coupled to the output of said amplifier and whose state reverses when the instantaneous values of said signals at said input become substantially equal, and a feedback network for producing said pulsating DC feedback signal under control of said switching means, said feedback network including a first network including a first reactive impedance means coupled to said input a source of charging current, and a point of reference potential, said switching means coupled to said first reactive impedance means connecting said first reactive impedance means to said source of charging current during intervals for which said switching means is in one state and connecting said first reactive impedance means to said reference point during intervals for which said switching means is in the opposite state, and electrical snap-action means providing a supplemental signal source for said feedback signal, said switching means coupled to said snap-action means so as to couple the supplemental signal from said snap-action means to said first reactive impedance means during the discharging interval thereby abruptly increasing the level of said feedback signal concurrently with the initiation of each said discharge interval and so as to decouple the supplemental signal from said snap-action means from said first reactive impedance means during the charging interval thereby abruptly decreasing the level of said feedback signal concurrently with the initiation of each said charging interval.

5. A controller system as in claim 4 additionally including a proportional-band potentiometer connected to said source of charging current, said potentiometer also connected to said first reactive impedance means for said one state of said switching means to provide across said first reactive impedance means a feedback voltage rising toward a value corresponding with the setting of said potentiometer; and in which said electrical snap-action means comprises a potential-divider connected to said first reactive impedance means for said opposite state of said switching means intermittently to provide a fixed feedback voltage additive to the falling feedback voltage of said first reactive impedance means.

6. A controller system as in claim 5 additionally including a second network in circuit with said first network to accumulate during successive charging and discharging of said first reactive impedance means a reset-voltage of magnitude dependent upon the average net value of said intermittent fixed feedback voltage.

7. A controller system as in claim 6 additionally including means coupled to said input of said amplifier and to said potentiometer for comparing the input to said amplifier with the charging voltage set by said potentiometer and effective so long as said input exceeds said charging voltage to limit the reset-voltage accumulated by a second reactive impedance of said second network.

8. A controller system as in claim 5 in which said proportional-band potentiometer is coupled to a power-line by a network providing across said potentiometer a voltage varying substantially as the square of the power-line voltage over the usual range of its variation.

9. A controller system including an amplifier whose input signal with respect to a circuit-common is jointly determined by the concurrent instantaneous values of a DC error signal and a pulsating DC signal, switching means coupled to the output of said amplifier and intermittently switched from one to the other of its opposite states as said input signal passes through zero value, and feedback means for producing said pulsating DC signal comprising a proportional-band potentiometer connected between a DC source and said circuit-common to provide between an adjustable tap thereof and said circuit-common a preselected value of DC charging voltage, a reactance-resistance network connected to said adjustable tap, said reactance-resistance network including interconnected reactance means and resistance means, and a potential-divider connected to said reactance-resistance network and to said circuit-common to provide between a tap thereof and said circuit-common a DC snap-action voltage, said switching means in one state thereof connecting said tap of said potential-divider to said circuit-common to subtract the snap-action voltage of said potential-divider from said error signal and disconnecting said adjustable tap from said circuit-common to permit charging said reactance means toward said preselected value of the charging voltage from a value depending upon the prior history of said input voltage, and said switching means in the opposite state thereof disconnecting said tap of said potential-divider from said circuit-common to add the snap-action voltage of said potential-divider to said error signal and connecting said adjustable tap to said circuit-common to permit discharging said reactance means toward said preselected value of said charging voltage.

10. A controller system as in claim 9 in which said DC source comprises a power-line and an interconnected network which varies said supply voltage substantially in accordance with the square of the power-line voltage over the usual range of its variation.

11. A controller system as in claim 9 additionally including
  a second reactance-resistance network in circuit with said first-named reactance-resistance network to accumulate a reset voltage, and
  means coupled to said input of said amplifier and said potentiometer for comparing the input to said amplifier with the charging voltage set by said potentiometer and effective, as long as said input exceeds said charging voltage, to limit said reset voltage.

References Cited

UNITED STATES PATENTS

| | | | |
|---|---|---|---|
| 3,141,136 | 7/1964 | Pagano | 307—230 X |
| 3,294,891 | 12/1966 | Bose | 307—230 X |

NATHAN KAUFMAN, *Primary Examiner.*

U.S. Cl. X.R.

330—185; 307—230, 246